US007476090B2

(12) United States Patent
Wood

(10) Patent No.: US 7,476,090 B2
(45) Date of Patent: Jan. 13, 2009

(54) VENTED TURBOCHARGER CENTER HOUSING AND METHOD

(75) Inventor: Terry G. Wood, Countryside, IL (US)

(73) Assignee: International Engine Intellectual Property Company, LLC, Warrenville, IL (US)

(*) Notice: Subject to any disclaimer, the term of this patent is extended or adjusted under 35 U.S.C. 154(b) by 322 days.

(21) Appl. No.: 11/247,689

(22) Filed: Oct. 11, 2005

(65) Prior Publication Data

US 2007/0081906 A1 Apr. 12, 2007

(51) Int. Cl.
*F04B 17/00* (2006.01)
*F02B 33/44* (2006.01)
(52) U.S. Cl. ........................ 417/407; 60/605.3
(58) Field of Classification Search .............. 417/407; 60/605.3; 184/6.11, 6.18, 6.16
See application file for complete search history.

(56) References Cited

U.S. PATENT DOCUMENTS 2,804,021 A * 8/1957 Swearingen ................. 417/407
2,805,819 A * 9/1957 Buchi, Sr. et al. ............ 417/372
3,834,156 A * 9/1974 Cutler et al. ................ 60/605.1
4,422,295 A * 12/1983 Minami et al. .............. 60/605.3
4,752,193 A * 6/1988 Horler ........................ 417/407

FOREIGN PATENT DOCUMENTS

JP 58135325 * 8/1983
JP 61038126 * 2/1986

* cited by examiner

*Primary Examiner*—Charles G Freay
(74) *Attorney, Agent, or Firm*—Jack D. Nimz; Jeffrey P. Calfa

(57) ABSTRACT

A turbocharger (300) for an internal combustion engine (500) includes a center housing (304) connected to a turbine housing (302) and a compressor housing (306). A shaft (318) is in a bore (314) of the center housing (304). An oil supply passage (328) is in fluid communication with the bore (314). An oil drain passage (310) is in fluid communication with a oil cavity (334) and the bore (314). A vent passage (330) is in fluid communication with the oil cavity (334) and an internal volume (520) of the internal combustion engine (500). Oil flow passes through the first passage (328) and the drain passage (310) during operation of the internal combustion engine (500). A first pressure of air (P1) in the oil cavity (334) is about equal to a second pressure of air (P2) in the internal volume (520) of the internal combustion engine (500).

5 Claims, 4 Drawing Sheets

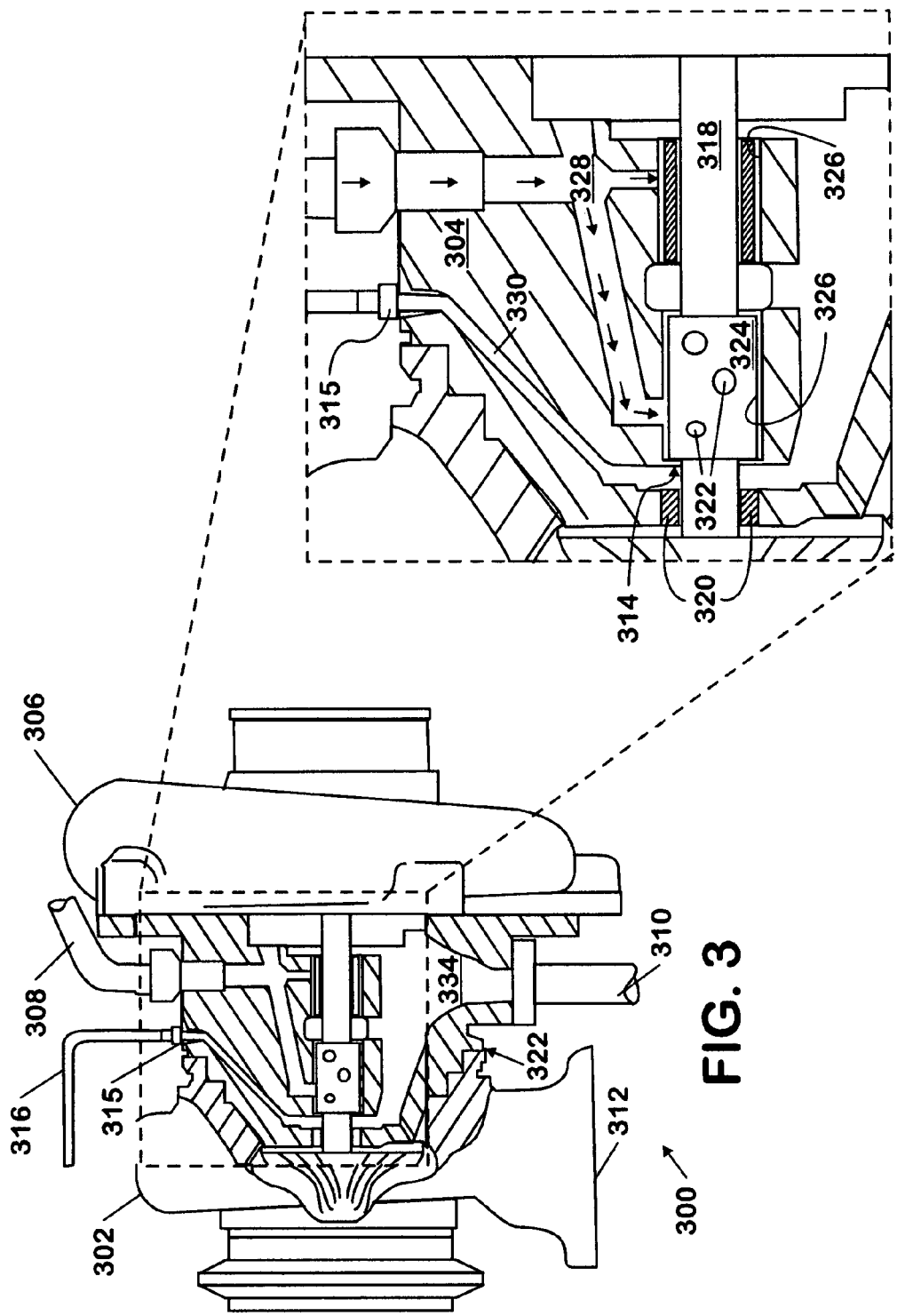

VENTED TURBOCHARGER CENTER HOUSING AND METHOD

FIELD OF THE INVENTION

This invention relates to turbochargers for internal combustion engines, including but not limited to turbocharger oil supply and oil return circuits.

BACKGROUND OF THE INVENTION

Use of turbochargers is known for internal combustion engines. A turbocharger includes a turbine connected to an exhaust system of an engine. Energy from the exhaust gas of the engine is used to power a turbine wheel within the turbine housing. The turbine wheel rotates a turbine shaft mounted in a center housing of the turbocharger between the turbine housing and a compressor housing. The turbine shaft is connected to a compressor wheel enclosed in the compressor housing, and is used to compress the incoming air of the engine.

Turbocharger shafts may reach rotation speeds of 270,000 revolutions per minute (RPM) or higher during operation of the engine. Due to the high rotational speeds of the turbine shaft, bearings are used to reduce friction of the turbine shaft and increase the service life of the turbocharger. Some turbine shaft bearings include ball bearings for severe applications, for example in racing engines, but most bearings are hydrodynamic bearings. In a hydrodynamic bearing, two cylindrical surfaces are in close proximity in the presence of a liquid. One of the two surfaces is static, and the other is attached to a rotating shaft, in this case, the turbine shaft.

In the case of an internal combustion engine, the fluid used to lubricate and operate the hydrostatic bearing in a turbocharger is engine lubrication oil. Engine oil is supplied to the center housing of the turbocharger, passes over the bearings, and drains through an opening, typically at the bottom of the center housing of the turbocharger. The oil typically returns back into the crankcase of the engine.

In some engine applications, factors such as high oil flow rates into the center housing of the turbocharger, steep angles of engine and vehicle operation, or sub-optimal oil passage routing, may create oil pooling in the center housing resulting from poor drainage of oil out of the center housing. Oil pooling in the center housing of the turbine may cause an increase in pressure of the air, and therefore the oil, inside the center housing that may, in turn, cause leakage of oil past the oil seals around the shaft and between the center housing and the turbine or compressor housings.

Accordingly, there is a need for better pressure management in the center housings of turbochargers that may experience poor oil drainage during operation.

SUMMARY OF THE INVENTION

A turbocharger for an internal combustion engine includes a center housing connected to a turbine housing and a compressor housing. A shaft is in a bore of the center housing. An oil supply passage is in fluid communication with the bore. An oil drain passage is in fluid communication with a oil cavity and the bore. A vent passage is in fluid communication with the oil cavity and an internal volume of the internal combustion engine. Oil flow passes through the first passage and the drain passage during operation of the internal combustion engine. A first pressure of air in the oil cavity is about equal to a second pressure of air in the internal volume of the internal combustion engine.

A method for use of a turbocharger includes the steps of collecting oil in an oil pan or reservoir of an internal combustion engine, pumping oil from the engine oil pan with an oil pump, supplying the pumped oil to the center housing of the turbocharger, draining oil from the center housing into the engine oil pan, and venting gas pressure from the center housing into the engine internal volume.

BRIEF DESCRIPTION OF THE DRAWINGS

FIG. 3 is a partial sectional view of a turbocharger having a center housing and including a vent passage in accordance with the invention.

FIG. 4 is an enlarged sectional view of a portion of the center housing of FIG. 3 showing a cavity containing a shaft and bearings, the cavity being connected to a vent passage in accordance with the invention.

DESCRIPTION OF A PREFERRED EMBODIMENT

Figure 1:
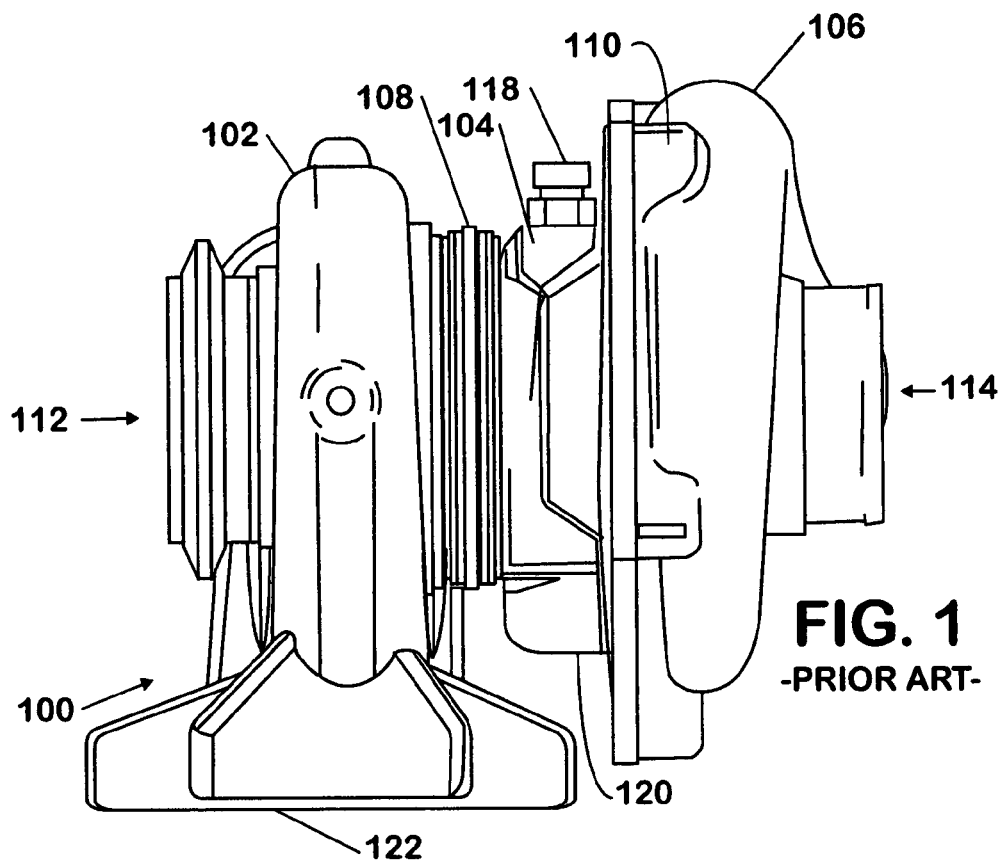
FIG. 1 is a side view of a prior art turbocharger having a center housing connected to a turbine housing and a compressor housing.

The following describes an apparatus for and method of improving drainage of oil from the center housing of a turbocharger during engine operation. A typical turbocharger 100 having a turbine housing 102, a center housing 104, and a compressor housing 106, is shown in FIG. 1. The turbine housing 102 is connected to the center housing 104 with a v-band clamp 108. The compressor housing 106 is connected to the center housing 104 by a plurality of bolts 110. The turbine housing 102 has an inlet (not shown) and an outlet 112. The compressor housing 106 has an inlet 114, and an outlet (not shown). The center housing 104 has an oil supply 118 and an oil drain 120. The turbocharger 100 may be connected to an engine by a mounting flange 122 which may be part of the turbine housing 102.

Figure 2:
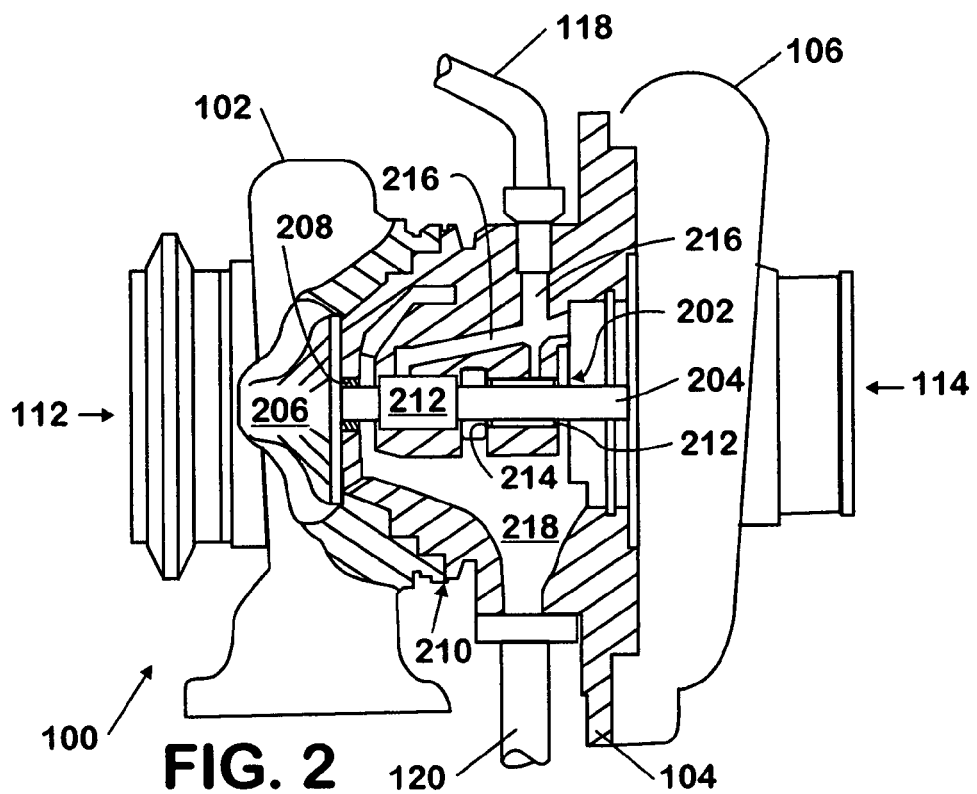
FIG. 2 is a partial sectional view of the center housing of the prior art turbocharger of FIG. 1 illustrating the housing interior and the turbine shaft with bearings.

A partial section of the turbocharger 100 is shown in FIG. 2. The center housing 104 has an inner bore 202 in fluid communication with the oil supply 118 and the oil drain 120. A turbine shaft 204 passes through the center housing bore 202. A turbine wheel 206 is disposed within the turbine housing 102, and is connected on an end of the turbine shaft 204. An oil seal 208 is disposed on the turbine shaft 204 close to an interface 210 between the turbine housing 102 and the center housing 104, to prevent oil from leaking from the center housing 104 into the turbine housing 102 or the compressor housing 106. A similar oil seal 208 is disposed on the compressor side of the shaft 204, where a compressor wheel (not shown) is connected to the shaft 204 and is disposed inside the compressor housing 106.

Two bearings 212 (one being shown in section) are disposed in the bore 202, between the shaft 204 and an inner surface 214 of the bore. The inner surface 214 may be machined into the center housing 104, and may serve as an outer race for the bearings 212. A first passage 216 fluidly connects the oil supply 118 with the inner surface 214. The bearings 212 may be sleeve bearings and may have a clearance with the inner surface 214 on their outer diameter, and the shaft 204 on their inner diameter, of about 0.0015 in. (3.81×10$^5$ m).

During operation, exhaust gases at an elevated pressure and temperature may enter the turbine housing 102 and cause the shaft 204 to rotate. Oil enters the center housing 104 from the oil inlet 118, travels to the inner surface 214 through the first passage 216, and fills a free volume between the bearings 212, the bore 202, and the shaft 204. As the shaft 204 rotates, the bearings 212 may also rotate at an angular velocity lower than the velocity of the shaft 204. The bearings 212 essentially "float" on a thin film of oil that is created between the bearings 212, the bore 202, and the shaft 204. After passing over the bearings 212, the oil continues to travel past the bore 202 and into a collection gallery 218 in the center housing 104. Oil may collect in the collection gallery 218 before exiting the center housing 104 through the oil outlet 120. A level of oil in the collection gallery 218 should be lower than the level of the shaft 204 in the center housing 104 to avoid potential leakage of oil past the seals 208. Moreover, an internal pressure of the gas (exhaust or air) within the center housing 104 should be about equal to an internal pressure within the engine oil pan or crankcase (not shown) that is in fluid communication with the oil outlet 120 and is intended to receive oil exiting from the collection gallery 218 to enable more efficient flow of oil into the center housing 104. Oil enters the center housing 104 under pressure imparted to the oil by an oil pump. An amount of oil flow depends in part on the difference between a supply pressure of the pump, and the destination pressure of air inside the center housing 104.

If drainage of oil out of the collection gallery 218 is impeded, oil may begin collecting excessively in the oil gallery 218. First, the level of oil in the collection chamber 218 may begin to rise up to and beyond the level of the shaft 204. If the oil rises to this level, the oil seals 208 may begin leaking a small amount of oil into the turbine housing 102 and the compressor housing 106. Furthermore, the pressure of air trapped in the center housing 104 will begin to rise with more oil at a high pressure is added to the center housing 104 through the oil inlet 118 than oil draining out of the oil drain 120. As pressure increases inside the center housing 104, leakage of oil past the seals 208 is exacerbated.

A turbocharger 300 capable of overcoming the aforementioned issues is shown in partial section in FIG. 3. The turbocharger 300 includes a turbine housing 302, a center housing 304, and a compressor housing 306. The center housing 304 has an oil supply 308, and an oil drain 310. The turbocharger 300 may be connected to an engine via a mounting flange 312 which may be part of the turbine housing 302.

The center housing 304 has an inner cavity 314 in fluid communication with the oil supply 308 and the oil drain 310. The center housing also includes a pressure port 315 disposed to be above the oil level within the cavity 314 at all times during engine operation, preferably above the turbine shaft 318, to prevent oil form entering. A turbine shaft 318 passes through the center housing bore 314. The turbine wheel 206 is disposed within the turbine housing 302, and is connected on an end of the turbine shaft 318. An oil seal 320 is disposed on the shaft 318 close to an interface 322 between the turbine housing 302 and the center housing 304 as shown. A similar oil seal configuration 320 is disposed on the compressor side of the shaft 318, where a compressor wheel (not shown) is connected to the shaft 318 and is disposed inside the compressor housing 306.

Two bearings 324 are disposed in the bore 314, between the shaft 318 and an inner surface 326. The Inner surface 326 may be machined into the center housing 304, and may serve as an outer race for the bearings 324. A first passage 328 fluidly connects the oil supply 118 with the inner surface 326. A second passage 330 connects the pressure port 315 with an oil cavity 334 and the bore 314. The bearings 324 may be sleeve bearings and may have a clearance with the inner surface 326 on their outer diameter, and the shaft 318 on their inner diameter, of about 0.0015 in. (3.81 ×10$^{-5}$ m). The bearings 324 may also each have a plurality of openings 322 to allow for improved fluid communication between their inner and outer surfaces.

A detail section view of a portion of the center housing 304 in the area of the bearings 324 is shown in FIG. 4. The arrows denote oil flow in the center housing 304. During operation, oil enters the center housing 304 from the oil inlet 308, travels to the inner surface 326 through the first passage 328, and fills a free volume between the bearings 324, the bore 314, and the shaft 318. After passing over the bearings 324, the oil continues to travel past the bore 314 and into the oil cavity 334 in the center housing 304. Oil may collect in the oil cavity 334 before exiting the center housing 304 through the oil outlet 310. To help maintain an optimal level of oil in the oil cavity 334, that is lower than the level of the shaft 318 in the center housing 304 to avoid potential leakage of oil past the seals 320, the second passage 330 is used to vent gas or air that may be trapped in the oil cavity 334.

Figure 5:
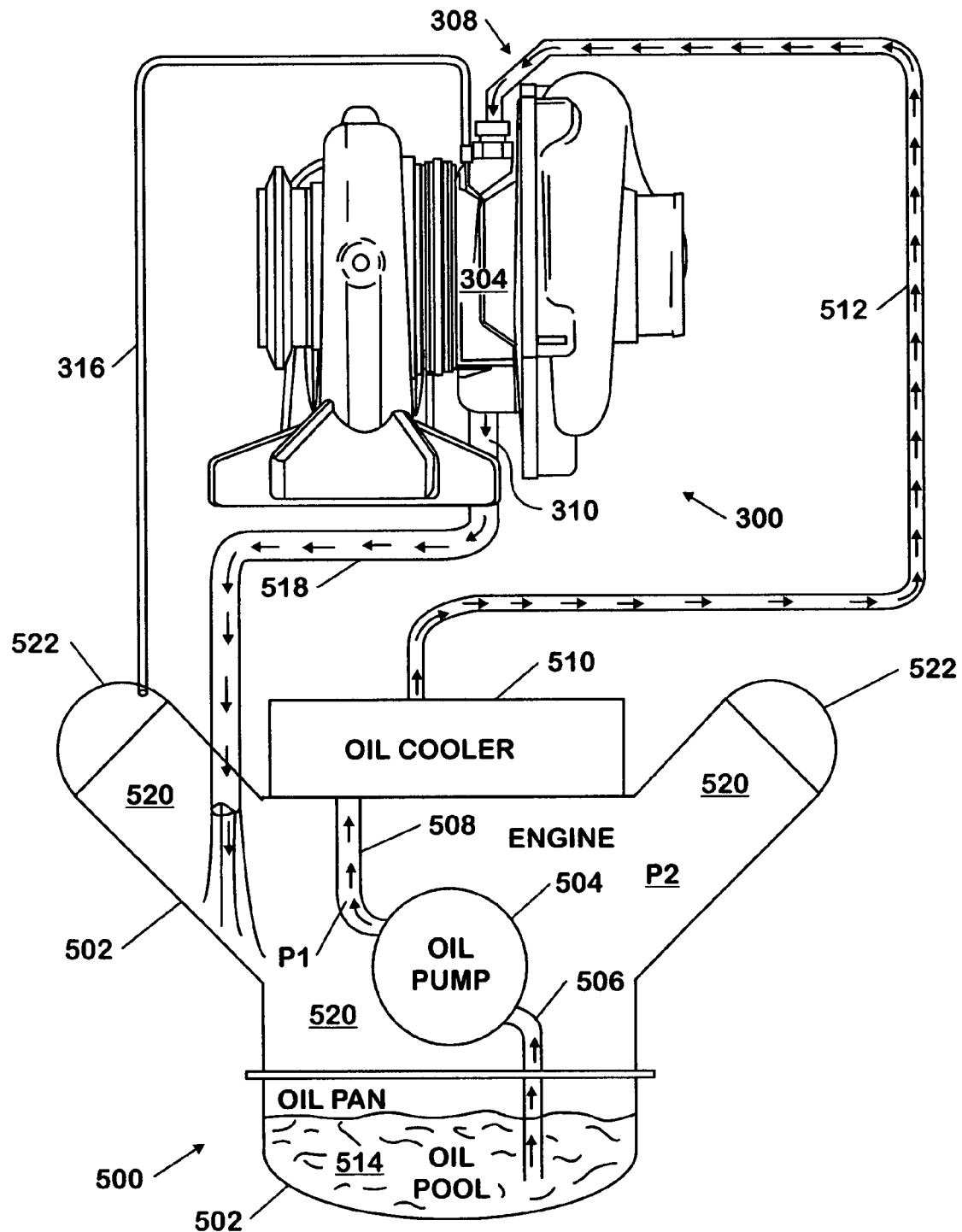
FIG. 5 is a block diagram of an engine having a turbocharger with a vent tube in accordance with the invention.

The second passage 330 fluidly connects the oil cavity 334 in the center housing 304 through the port 315 and tube 316 with a crankcase 502 of an engine 500, as shown in FIG. 5. The engine 500 may include the crankcase 502, which may contain an oil pump 504, a sump feed 506, and an oil cooler feed 508. The engine 500 may additionally have an oil cooler 510 connected to a turbocharger oil supply line 512. During operation of the engine 500, oil may be drawn to the pump 504 through the sump feed 506 that may be submerged in an oil pool 514 collected in an oil pan 516 that is connected to the crankcase 502. The pump 504 will push oil into the oil cooler feed 508. Oil entering the oil cooler 510 may be distributed to many areas and components of the engine 500 for cooling and lubrication of the engine 500 as is known in the art. A portion of the oil flow exiting the oil cooler 510 may be routed to the turbocharger oil supply line 512. Oil flow in the oil supply line 512 may enter the turbocharger 300 from the oil inlet 308 to the center housing 304 as discussed above. The turbocharger 300 may be connected to the engine 500, but is shown above the engine 500 for the sake of clarity concerning oil connections.

Oil flow exiting the center housing 304 from the oil outlet 310 is collected in an oil drain line 518. The oil drain line 518 fluidly connects the center housing 304 with an internal volume 520 of the crankcase 502. Oil exiting the drain line 518 may be allowed to pour into the internal volume 520 through a convenient location, for example, a valve cover 522, and collect under the force of gravity into the oil pan 514. Oil is compelled to flow through the center housing 304 because of a pressure difference between a high pressure P1 generated by the pump 504 and a low pressure P2 of the air inside the crankcase 502. The high pressure P1 is an outlet oil pressure within the oil cooler feed 508 that may be within a range of about 12 to 30 PSI (83 to 207 kPa) during normal operation of a warm engine, and may reach pressures up to 150 PSI (1 MPa) under cold engine conditions. The gas pressure P2 within the crankcase 502 of the engine 500 may be between about 3 to 10 inches of Mercury (10 to 34 kPa) during normal operation.

If oil flow through the drain line 518 is unimpeded, an internal pressure P3 of the air inside the center housing 304 should be about equal to the internal air pressure P2 of the crankcase 502. If oil flow through the drain line 518 is impeded, for example, if the engine 500 is operated at an angle that creates a standing column of oil creating hydrostatic pressure in the drain line 518, drainage of oil out of the center housing 304 is impeded, resulting in oil leakage past the seals 320 as discussed above.

To avoid an increase of the pressure P3 inside the center housing 304 above the low pressure P2 in the internal volume 520, a pressure vent tube 316 fluidly connects the center housing 304 with the internal volume 520. The pressure vent tube 316 ensures that the pressure P3 will be equal to the pressure P2. By equating the pressures P3 and P2, smooth flow of oil is ensured in the center housing 304.

Figure 6:
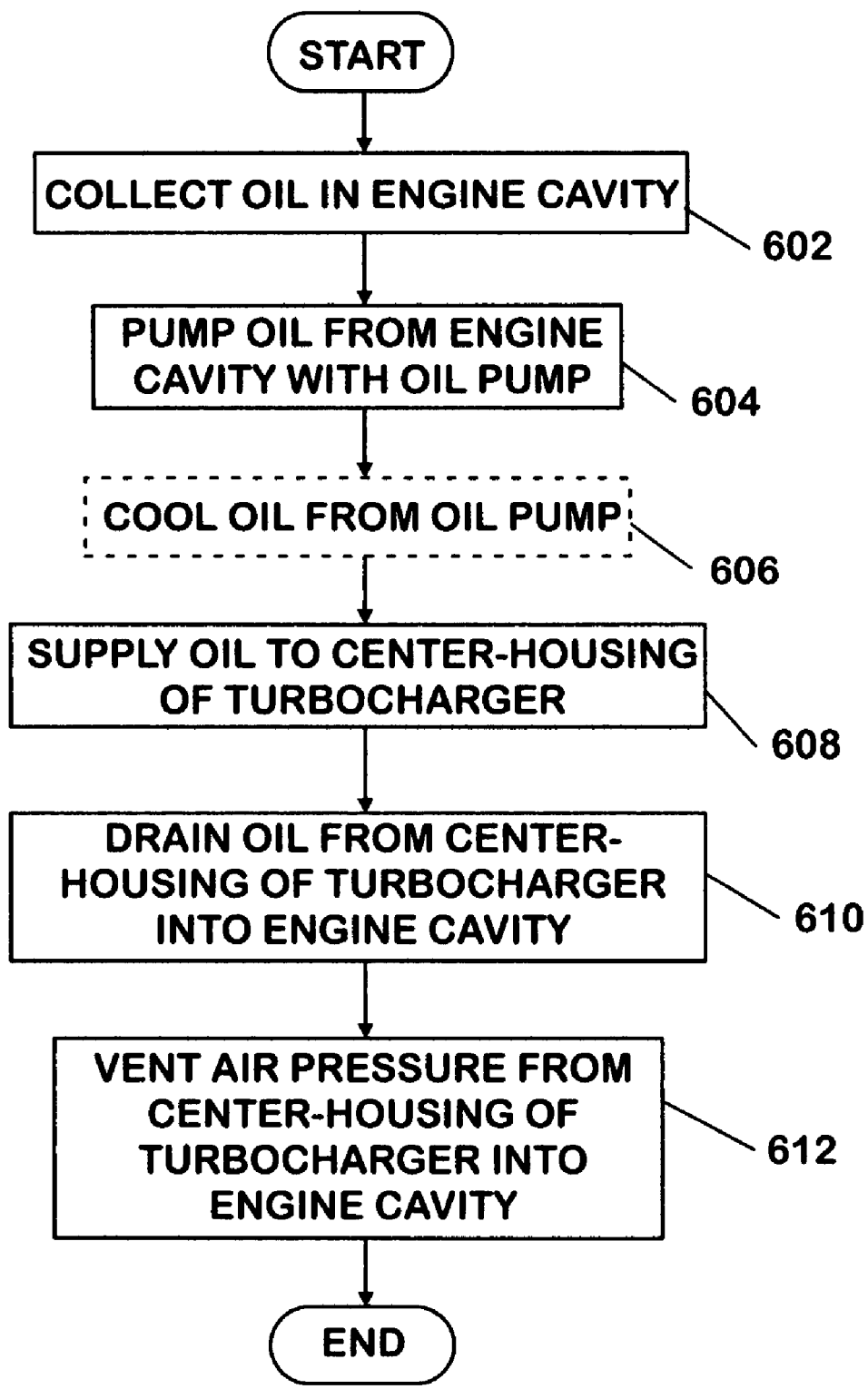
FIG. 6 is a flow chart for a method of venting a center housing of a turbocharger to an engine internal volume in accordance with the invention.

A method for venting pressure from the center housing 304 of the turbocharger 300 is shown in FIG. 6. In step 602, oil is collected in the oil pan 516 of the engine 500, creating an oil pool 514. Oil from the oil pool 514 is pumped through a sump feed 506 of an oil pump 504. On engines equipped with an oil cooler 510, and optional step 606 of cooling the oil may be performed. The pumped oil is supplied to the center housing 304 through an turbocharger supply line 512 at step 608. Oil is drained back into the engine volume 520 from the drain outlet 310 of the center housing 304 at step 610. The air pressure P3 is vented to the pressure P2 of the engine internal volume 520 at step 612 to ensure that the pressures P3 and P2 are about equal, or, within 5% of each other. The process of FIG. 6 may be repeated as long as the engine 500 is in operation.

Venting a center housing of a turbocharger into a internal volume of an engine is advantageous because the risk of oil leakage caused by poor drainage of oil from the center housing is reduced. In a preferred embodiment, a vent tube is used to connect the center housing with the engine crankcase at a convenient location, for example, a valve cover. The vent tube described herein is an open vent tube without any valves incorporated therein. Alternatively, a valve may be used to fluidly block the vent tube at times. A valve to block the vent tube may be advantageous, for example, under conditions where cold engine oil having a high viscosity is pushed into the center housing during engine startup. The vent tube may be a solid steel tube, or may alternatively be made from elastomeric materials that may also advantageously be heat resistant. In the embodiment shown, the vent tube is tapped in a location toward the top of the center housing, to avoid the passage of liquid oil through it. Alternatively, the vent tube may be tapped at any location of the center housing above fluid level, or above the level of the shaft, because the primary function of the vent tube is to vent gas externally from the cavity. Moreover, the vent tube may be open to the atmosphere, and have a check valve (not shown) with a floatation device that will prevent liquid oil from exiting the vent tube. Moreover, the vent allows for proper drainage of oil from the center housing after the engine is turned off.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An Internal combustion engine comprising:
    an engine structure having an Internal volume including an oil reservoir, wherein an amount of oil is collected in an oil pool in the reservoir;
    a turbocharger mounted to said engine structure and having a center-housing connected to a turbine housing and a compressor housing;
    wherein the center-housing includes
        a bore,
        a shaft disposed in the bore operatively coupling a turbine wheel inside the turbine housing with a compressor wheel inside the compressor housing,
        at least one bearing disposed between the shaft and the bore,
        an oil cavity,
        an oil supply passage and an oil drain passage, in fluid communication with the oil cavity, and;
        a vent passage that opens to the oil cavity at a location along an exposed portion of the length of the shaft extending between the bearing and an oil seal that is disposed on the shaft proximate an interface between the center-housing and the turbine housing;
    an oil pump in fluid communication with the oil supply passage and the oil pool;
    a vent tube fluidly connecting the vent passage with the internal volume, wherein the vent tube is arranged to equalize pressure of the oil cavity In the center-housing to pressure of the internal volume of the engine structure by communicating with the oil cavity through the vent passage in the center-housing and not through the oil supply and oil passages.

2. The Internal combustion engine of claim 1, wherein the oil drain passage is in fluid communication with the oil reservoir.

3. The internal combustion engine of claim 1, wherein an amount of oil is disposed at an operating level in the center housing cavity during operation of the internal combustion engine the operating level being below a level of the shaft in the center housing.

4. The internal combustion engine of claim 1, the engine structure further comprising a valve cover, wherein the internal volume is enclosed by the valve cover and is in fluid communication with the oil reservoir, and the vent tube is operatively connected to the valve cover to vent to the internal volume of the engine through the valve cover.

5. The internal combustion engine of claim 1, further comprising an oil cooler in fluid communication with the oil pump and the oil supply passage.

* * * * *